United States Patent
Pham Van et al.

(10) Patent No.: US 11,451,961 B2
(45) Date of Patent: Sep. 20, 2022

(54) SECURITY ENHANCEMENTS FOR EARLY DATA TRANSMISSIONS

(71) Applicant: TELEFONAKTIEBOLAGET LM ERICSSON (PUBL), Stockholm (SE)

(72) Inventors: Dung Pham Van, Upplands Väsby (SE); Magnus Stattin, Upplands Väsby (SE); Andreas Höglund, Solna (SE); Tuomas Tirronen, Helsinki (FI); Emre Yavuz, Stockholm (SE); Vesa Lehtovirta, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/651,127

(22) PCT Filed: Sep. 28, 2018

(86) PCT No.: PCT/IB2018/057563
§ 371 (c)(1),
(2) Date: Mar. 26, 2020

(87) PCT Pub. No.: WO2019/064261
PCT Pub. Date: Apr. 4, 2019

(65) Prior Publication Data
US 2020/0288319 A1 Sep. 10, 2020

Related U.S. Application Data

(60) Provisional application No. 62/564,614, filed on Sep. 28, 2017.

(51) Int. Cl.
*H04W 12/10* (2021.01)
*H04W 76/10* (2018.01)
(Continued)

(52) U.S. Cl.
CPC ......... *H04W 12/10* (2013.01); *H04W 12/037* (2021.01); *H04W 74/0833* (2013.01); *H04W 76/10* (2018.02)

(58) Field of Classification Search
CPC ... H04W 12/10; H04W 76/10; H04W 12/037; H04W 74/0833; H04W 4/70; H04L 63/0457; H04L 63/12
See application file for complete search history.

(56) References Cited

U.S. PATENT DOCUMENTS

| | | | |
|---|---|---|---|
| 2009/0163211 A1* | 6/2009 | Kitazoe | H04W 74/0866 455/436 |
| 2010/0202476 A1* | 8/2010 | Chun | H04W 28/06 370/477 |

(Continued)

OTHER PUBLICATIONS

Qualcomm Incorporated, UL early data transmission, R2-1708239, 3GPP TSG-RAN WG2 Meeting #99, Berlin, Germany, Aug. 21-25, 2017.

(Continued)

*Primary Examiner* — Dinh Nguyen
(74) *Attorney, Agent, or Firm* — Sage Patent Group

(57) ABSTRACT

A method is provided for use in a wireless device. The method comprises determining a connection request and uplink data to transmit in response to a random-access response received from a network node. The method further comprises generating security information based at least in part on the uplink data. The method further comprises transmitting a radio transmission in response to the random-access response. The radio transmission comprises the connection request and the uplink data secured by the security information.

28 Claims, 13 Drawing Sheets

(51) Int. Cl.
*H04W 74/08* (2009.01)
*H04W 12/037* (2021.01)

(56) References Cited

U.S. PATENT DOCUMENTS

2014/0036685 A1* 2/2014 Kim .................. H04W 12/037
                                                    370/236
2016/0014815 A1   1/2016 Vajapeyam et al.
2018/0092156 A1* 3/2018 Kim .................. H04W 72/0406

OTHER PUBLICATIONS

Ericsson, Bearer Setup and Security Considerations for Early Data in MTC, R2-1708630, 3GPP TSG-RAN WG2 #99, Berlin, Germany, Aug. 21-25, 2017.
Huawei, et al., On early data transmission for NB-IoT, R1-1713363, 3GPP TSG RAN WG1 Meeting #90, Prague, Czech Republic, Aug. 21-25, 2017.
3GPP TS 36.331 V14.4.0, 3rd Generation Partnership Project; Technical Specification Group Radio Access Network; Evolved Universal Terrestrial Radio Access (E-UTRA); Radio Resouice Control (RRC); Protocol specification (Release 14), Sep. 2017.
3GPP TS 36.323 V14.4.0, 3rd Generation Partnership Project; Technical Specification Group Radio Access Network; Evolved Universal Terrestrial Radio Access (E-UTRA); Packet Data Convergence Protocol (PDCP) specification (Release 14), Sep. 2017.
3GPP TS 36.321 V14.4.0, 3rd Generation Partnership Project; Technical Specification Group Radio Access Network; Evolved Universal Terrestrial Radio Access (E-UTRA); Medium Access Control (MAC) protocol specification (Release 14), Sep. 2017.
3GPP TS 33.401 V15.1.0, 3rd Generation Partnership Project; Technical Specification Group Services and System Aspects; 3GPP System Architecture (SAE); Security architecture (Release 15), Sep. 2017.
3GPP TS 36.300 V14.4.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Sep. 2017.
3GPP TS 36.322 V14.1.0, 3rd Generation Partnership Project; Technical Specification Group Radio Access Network; Evolved Universal Terrestrial Radio Access (E-UTRA); Radio Link Control (RLC) protocol specification (Release 14), Sep. 2017.

* cited by examiner

SECURITY ENHANCEMENTS FOR EARLY DATA TRANSMISSIONS

This application is a 371 of International Application No. PCT/IB2018/057563, filed Sep. 28, 2018, which claims the benefit of U.S. Application No. 62/564,614, filed Sep. 28, 2017, the disclosures of which are fully incorporated herein by reference.

TECHNICAL FIELD

The present disclosure relates, in general, to wireless communications and, more particularly, to enhancing the security of early data transmitted with connection requests.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

There has been a lot of work in 3GPP lately on specifying technologies to cover Machine-to-Machine (M2M) and/or Internet of Things (IoT) related use cases. Most recent work for 3GPP Release 13 and 14 includes enhancements to support Machine-Type Communications (MTC) with new User Equipment (UE) categories (Cat-M1, Cat-M2), supporting reduced bandwidth of up to 6 and 24 physical resource blocks (PRBs), and Narrowband IoT (NB-IoT) UEs providing a new radio interface (and UE categories Cat-NB1 and Cat-NB2).

We will refer to the Long-Term Evolution (LTE) enhancements introduced in 3GPP Release 13, 14, and 15 for MTC as "eMTC", including (not limiting) support for bandwidth limited UEs, Cat-M1, and support for coverage enhancements. This is to separate discussions from NB-IoT (notation here used for any Release), although the supported features are similar on a general level.

For both eMTC and NB-IoT, 'CIoT EPS UP optimization' and 'CIoT EPS CP optimization' signaling reductions were also introduced in Rel-13. The former, here referred to as UP-solution, allows the UE to resume a previously stored Radio Resource Control (RRC) connection (thus also known as RRC Suspend/Resume). The latter, here referred to as CP-solution, allows the transmission of user-plane data over Non-Access Stratum (NAS) (aka DoNAS).

For 3GPP Release 15, new work items (WIs) "Even further enhanced MTC for LTE (LTE_eMTC4)" [WI_eMTC] and "Further NB-IoT enhancements (NB_IO-Tenh2)" [WI_NBIOT] target eMTC and NB-IoT enhancements, respectively. In both of these WIs, a common goal is to reduce UE power consumption and latency through introducing possibilities to send data as early as possible during the Random Access (RA) procedure:

From [WI_eMTC]:
Support early data transmission [RAN2 lead, RAN1, RAN3]
Evaluate power consumption/latency gain and specify necessary support for DL/UL data transmission on a dedicated resource during the RA procedure (after PRACH transmission and before the RRC connection setup is completed) at least in the RRC Suspend/Resume case.

And from [WI_NBIOT]:
Evaluate power consumption/latency gain and specify necessary support for DL/UL data transmission on a dedicated resource during the RA procedure after NPRACH transmission and before the RRC connection setup is completed. [RAN2, RAN1, RAN3].

During RAN2#99, several contributions on early data transmissions were discussed, and one of the agreements is to support early UL data transmission in Msg3 for Rel-13 UP solution. Existing solutions for realizing the early data transmission concept have recently been presented in prior art such as P71767, P72098, and P72654.

To facilitate the description of the presented solutions, the messages in the RA procedure are commonly referred to as message 1 (Msg1) through message 4 (Msg4). From TS36.300, the contention based RA procedure is illustrated as in FIG. 1.

In LTE, Msg3 is an early message and with neither confidentially nor integrity protection. In UP solution, Msg3 includes the RRCConnectionResumeRequest (in short ResumeRequest). For Rel-14 and earlier releases, the ResumeRequest is formed at RRC layer with a security token, i.e., 16-bit shortResumeMAC-I (sRMAC-I) that is used to validate the authenticity of the ResumeRequest. In addition, user data in UP solution is transmitted after the RRC connection resumption with AS protection. The earliest time UL data can be transmitted is in Msg5, i.e., uplink (UL) data is multiplexed with the RRCConnectionResumeComplete. The transmission of Msg5 is considered from a legitimate UE if the network node (e.g., an evolved NodeB (eNB)) successfully verifies Msg5 based on a 32-bit message authentication code for integrity protection (MAC-I), which is calculated and checked at the PDCP sublayer. In case of successful verification, the UL data received in Msg5 is forwarded from the eNB to the serving gateway (S-GW).

It is proposed herein a solution to enhance security for early data Msg3 to support immediate forwarding of UL user data received at the eNB in Msg3 toward S-GW with an appropriate security level with respect to legacy LTE operations. Although this disclosure is focused on LTE, NB-IoT, it is also applicable for 5G/NR.

There currently exist certain challenge(s). In Rel-13 RRC Suspend/Resume solution, the ResumeRequest does not have Packet Data Convergence Protocol (PDCP) support, yet it includes the 16-bit sRMAC-I as a security token to validate the authenticity of the resume request. This security token is calculated and verified at the RRC layer based on a set of variables including the target Cell ID, the source physical Cell ID, and the Cell Radio Network Temporary Identifier (C-RNTI) used in the source cell.

However, when it comes to early data in Msg3 where UL data is multiplexed with the ResumeRequest, such a 16-bit sRMAC-I parameter may be insufficient for protection of user data and the signaling, especially when compared to the legacy AS integrity protection level of Msg5, i.e., by a 32-bit MAC-I provided by the PDCP sublayer. In other words, forwarding the UL data received at the eNB to the S-GW before the integrity verification of Msg5 is a concern. Therefore, methods for enhancements of early data Msg3 security are of vital importance.

Certain aspects of the present disclosure and their embodiments may provide solutions to these or other challenges. FIG. 2 illustrates the L2 protocol structure for transmission of Msg3 in early data transmission with RRC Suspend/Resume (modified based on TS36.300). By the time the ResumeRequest is submitted to L2, the available signaling radio bearers are SRB0 and SRB1. The ResumeRequest can thus be transmitted over either of the two radio bearers, each having its own characteristics in terms of security support. Currently, in Release 13 and 14, the ResumeRequest is transmitted on Common Control Channel (CCCH) logical channel (SRB0) without AS security support. The sRMAC-I parameter added at the RRC layer is of the length of only 16 bits. Meanwhile, transmissions on Dedicated Control Channel (DCCH) logical channel (SRB1) have AS integrity protection support at the PDCP sublayer.

Disclosed herein is a security solution for early data Msg3 in RRC Suspend/Resume case in which the ResumeRequest is transmitted on either CCCH logical channel (SRB0) or DCCH logical channel (SRB1). The proposed security solution is comprised of different alternatives, which are characterized by following aspects:

Dependency on Msg3 grant size: The security information for Msg3 protection may result in the situation where provided UL grant, i.e., transport block size of Msg3 is not sufficient to accommodate the formed Msg3 MAC PDU. With the alternatives, the UE can adaptively decide the security information accordingly to the provided UL grant.

Properties of security information: The two different types of aforementioned security parameters, i.e., the RRC sRMAC-I and PDCP MAC-I have their own attributes. The security solution aims at taking the good attributes from the two by combining them in a flexible manner.

Incurred overhead: The security information may incur additional overhead, i.e., additional bits used for the security parameter in the message. The solution can trade the incurred overhead with the required (expected) security level and the amount of UL data to be included in the Msg3.

Backward-compatibility: The security solution allows pre-Release 15 UEs and early data capable UEs adopting its alternatives to coexist in the same network.

In particular, the solutions proposed in this disclosure include three alternatives as follows:

Case 1: ResumeRequest over SRB0, 32-bit RMAC-I at RRC layer

Case 2: ResumeRequest over SRB1, 32-bit MAC-I at PDCP sublayer

Case 3: ResumeRequest over SRB1, 16-bit sRMAC-I at RRC layer and X bits MAC-I at PDCP There are, proposed herein, various embodiments which address one or more of the issues disclosed herein. For example, certain embodiments solve the problem of how to enhance the security for Msg3 with UL data included therein in the context of early data transmission concept being considered in LTE, NB-IoT, and 5G/NR.

Certain embodiments may provide one or more of the following technical advantage(s). For example, one advantage of this solution is that it provides various alternatives for enhancing the security level of Msg3 when adopting early data transmission concept. The security level for Msg3 can be adaptively configured by the UE based on provided UL grant for Msg3 and the overhead incurred due to the security information. This is very beneficial, especially in the situations where the UL grant for Msg3 is not deterministic. Furthermore, the proposed solution ensures backward compatibility.

SUMMARY

According to an embodiment, a method is provided for use in a wireless device. The method comprises determining a connection request and uplink data to transmit in response to a random-access response received from a network node. The method further comprises generating security information based at least in part on the uplink data. The method further comprises transmitting a radio transmission in response to the random-access response, the radio transmission comprising the connection request and the uplink data secured by the security information.

According to another embodiment, a wireless device comprises memory and processing circuitry. The memory is operable to store instructions. The processing circuitry is operable to execute the instructions. The wireless device is operable to determine a connection request and uplink data to transmit in response to a random-access response received from a network node. The wireless device is further operable to generate security information based at least in part on the uplink data. The wireless device is further operable to transmit a radio transmission in response to the random-access response. The radio transmission comprise the connection request and the uplink data secured by the security information.

According to yet another embodiment, a computer program product comprises a non-transitory computer readable medium storing computer readable program code. The computer readable program code comprises program code for determining a connection request and uplink data to transmit in response to a random-access response received from a network node. The computer readable program code further comprises program code for generating security information based at least in part on the uplink data. The computer readable program code further comprises program code for transmitting a radio transmission in response to the random-access response. The radio transmission comprises the connection request and the uplink data secured by the security information.

The above-described method, wireless device, and/or computer program code may include various other features, including any one or more of the following:

In particular embodiments, the security information comprises a 16-bit or 32-bit security token.

In particular embodiments, the security information comprises a message authentication code.

In particular embodiments, a size of the security information is based on a received uplink grant from the network node.

In particular embodiments, the method/wireless device/computer program code further comprises generating two or more preliminary radio transmissions. The two or more preliminary radio transmissions comprise different message sizes. The method/wireless device/computer program code further comprises selecting to transmit a respective one of the preliminary radio transmissions as the radio transmission based on a transport block size indicated in the random-access response. In some embodiments, a largest of the two or more preliminary radio transmissions that can be accommodated by the indicated transport block size is selected to transmit as the radio transmission.

In particular embodiments, the method/wireless device/ computer program code further comprises generating a first preliminary radio transmission. The method/wireless device/ computer program code further comprises determining that a transport block size indicated in the random-access response is insufficient to accommodate the first preliminary radio transmission. The method/wireless device/computer program code further comprises generating a second preliminary radio transmission having a largest size that can be accommodated by the indicated transport block size. The second preliminary radio transmission is transmitted as the radio transmission.

In particular embodiments, the method/wireless device/ computer program code further comprises generating a first preliminary radio transmission. The method/wireless device/ computer program code further comprises determining that a transport block size indicated in the random-access response can accommodate a larger radio transmission than the first preliminary radio transmission. The method/wireless device/computer program code further comprises generating a second preliminary radio transmission having a largest size that can be accommodated by the indicated transport block size. The second preliminary radio transmission is transmitted as the radio transmission.

In particular embodiments, the largest size that can be accommodated by the indicated transport block size corresponds to a longest length that can be used for the security information.

In particular embodiments, the security information is generated at least in part at the RRC layer.

In particular embodiments, the security information is generated at least in part at the PDCP layer.

In particular embodiments, at least a part of the security information is generated at the RRC layer and at least a part of the security information is generated at the PDCP layer.

In particular embodiments, the radio transmission is secured with access stratum integrity protection.

In particular embodiments, the radio transmission is secured without access stratum integrity protection.

In particular embodiments, generating the security information is further based on at least one of a ResumeID and a cause value.

In particular embodiments, the method/wireless device/ computer program code further comprises multiplexing the connection request and uplink data to form the radio transmission.

In particular embodiments, the connection request is transmitted using the SRB0 radio bearer prior to multiplexing.

In particular embodiments, the connection request is transmitting using the SRB1 radio bearer prior to multiplexing.

In particular embodiments, the method/wireless device/ computer program code further comprises indicating to the network node information from which the network node can identify how the wireless device generated the security information.

According an embodiment, a method is provided for use in a network node. The method comprises transmitting a random-access response to a random-access request from a wireless device to the wireless device. The method further comprises receiving a radio transmission in response to the random-access response. The radio transmission comprises a connection request and uplink data secured by security information. The security information is generated based on at least in part on the uplink data.

According to another embodiment, a network node comprises memory and processing circuitry. The memory is operable to store instructions. The processing circuitry is operable to execute the instructions. The network node is operable to transmit a random-access response to a random-access request from a wireless device to the wireless device. The network node is further operable to receive a radio transmission in response to the random-access response. The radio transmission comprises a connection request and uplink data secured by security information. The security information is generated based on at least in part on the uplink data.

According to yet another embodiment, a computer program product comprises a non-transitory computer readable medium storing computer readable program code. The computer readable program code comprises program code for transmitting a random-access response to a random-access request from a wireless device to the wireless device. The computer readable program code further comprises program code for receiving a radio transmission in response to the random-access response. The radio transmission comprises a connection request and uplink data secured by security information. The security information is generated based on at least in part on the uplink data.

The above-described method, network node, and/or computer program code may include various other features, including any one or more of the following:

In particular embodiments, the method/network node/ computer program code further comprises determining how to decode the radio transmission by evaluating information in the radio transmission related to how the wireless device generated the security information.

In particular embodiments, the method/network node/ computer program code further comprises decoding (V240) the radio transmission and receiving (V250) the connection request and uplink data in the radio transmission.

In particular embodiments, the method/network node/ computer program code further comprises furthering a random-access procedure comprising the random-access response using the connection request.

In particular embodiments, the security information comprises a 16-bit or a 32-bit security token.

In particular embodiments, a size of the security information is based on a size of an uplink grant provided in the random-access response.

In particular embodiments, the security information is generated at least in part at the RRC layer.

In particular embodiments, the security information is generated at least in part at the PDCP layer.

In particular embodiments, at least a part of the security information is generated at the RRC layer and at least a part of the security information is generated at the PDCP layer.

In particular embodiments, the radio transmission is secured with access stratum integrity protection.

In particular embodiments, the radio transmission is secured without access stratum integrity protection.

In particular embodiments, generating the security information is further based on at least one of a ResumeID and a cause value.

Certain embodiments may provide one or more of the following technical advantages. For example, certain embodiments may provide various configurations for enhancing the security level of Msg3 including early data. As another example, the security level (and security information used) for Msg3 can be adaptively configured by the wireless device based on provided UL grant for Msg3 based on the available overhead for security information. This may be particularly useful in situations where the wireless device cannot determine the UL grant prior to receiving the grant from the network node and can ensure backwards compatibility. As yet another example, certain embodiments allow the security information to be based on the content of the early data, thereby providing a more robust security measure. Other advantages may be readily apparent to one having skill in the art. Certain embodiments may have non, some, or all of the above-recited advantages.

BRIEF DESCRIPTION OF THE DRAWINGS

For a more complete understanding of the disclosed embodiments and their features and advantages, reference is now made to the following description, taking in conjunction with the accompanying drawings, in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Solutions for the Case ResumeRequest is Transmitted Over SRB0

The common characteristics of UP-based early data alternatives are to have the UE context including Access Stratum (AS) security context re-activated before the ResumeRequest is submitted to lower layers. In particular, the suspended SRB1, DRB, and L2 states, e.g., of PDCP and RLC entities are resumed/restored. In addition, new AS keys need to be available at the same time, that requires the nextHop-ChainingCounter (NCC) parameter to be sent earlier to the UE, e.g., during the suspend procedure. This way, transmission of Msg3 can have AS support including security. User data is transmitted over a DRB on DTCH logical channel and is then MAC multiplexed with the ResumeRequest, which is transmitted over a signaling bearer (i.e., SRB0 or SRB1) on the control channel.

Figure 1:
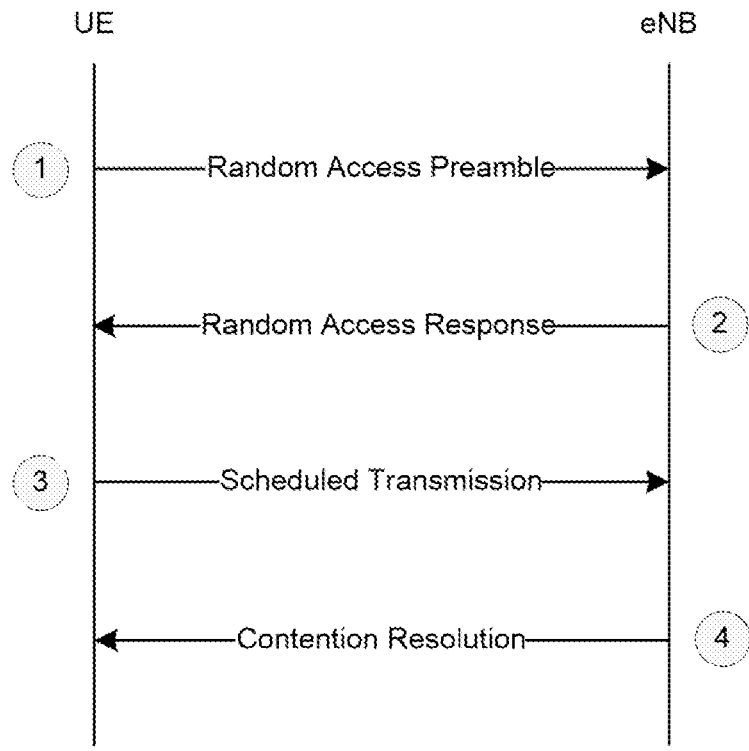
FIG. 1 illustrates an example signalling diagram for contention-based random-access procedure between a wireless device and a network node, according to certain embodiments.
Figure 2:
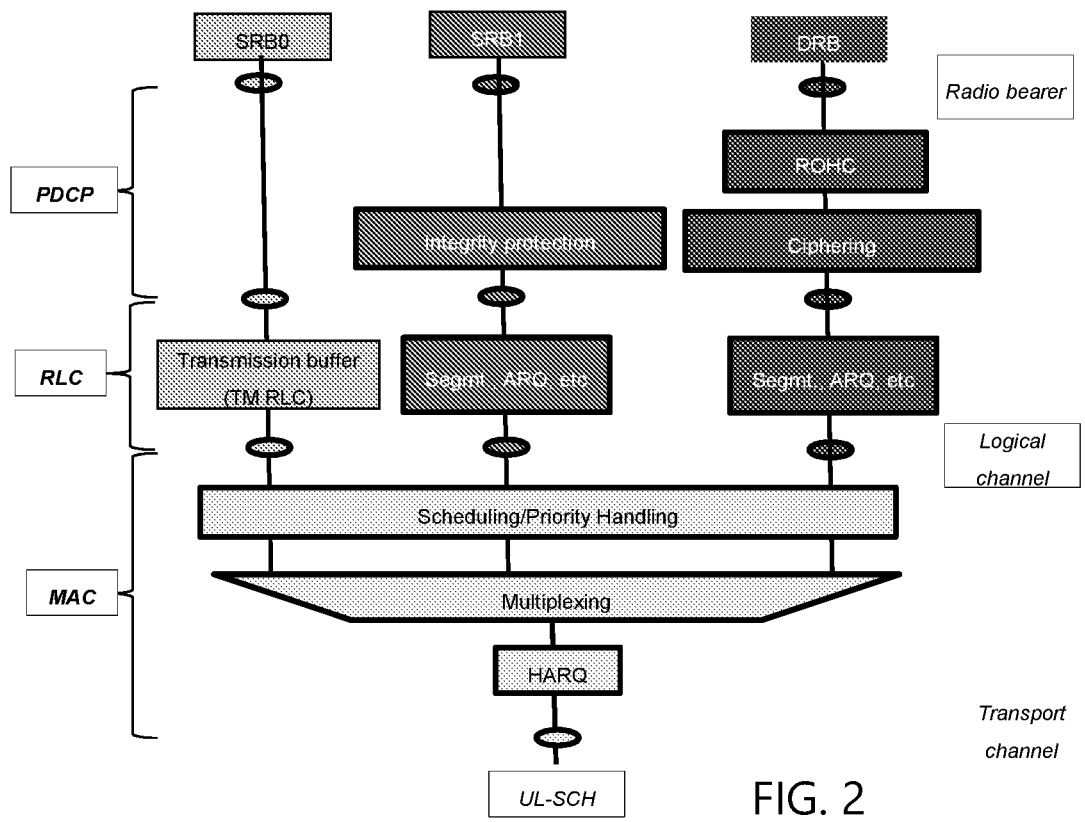
FIG. 2 illustrates an example layer 2 structure for Msg3 transmission, according to certain embodiments.
Figure 3:
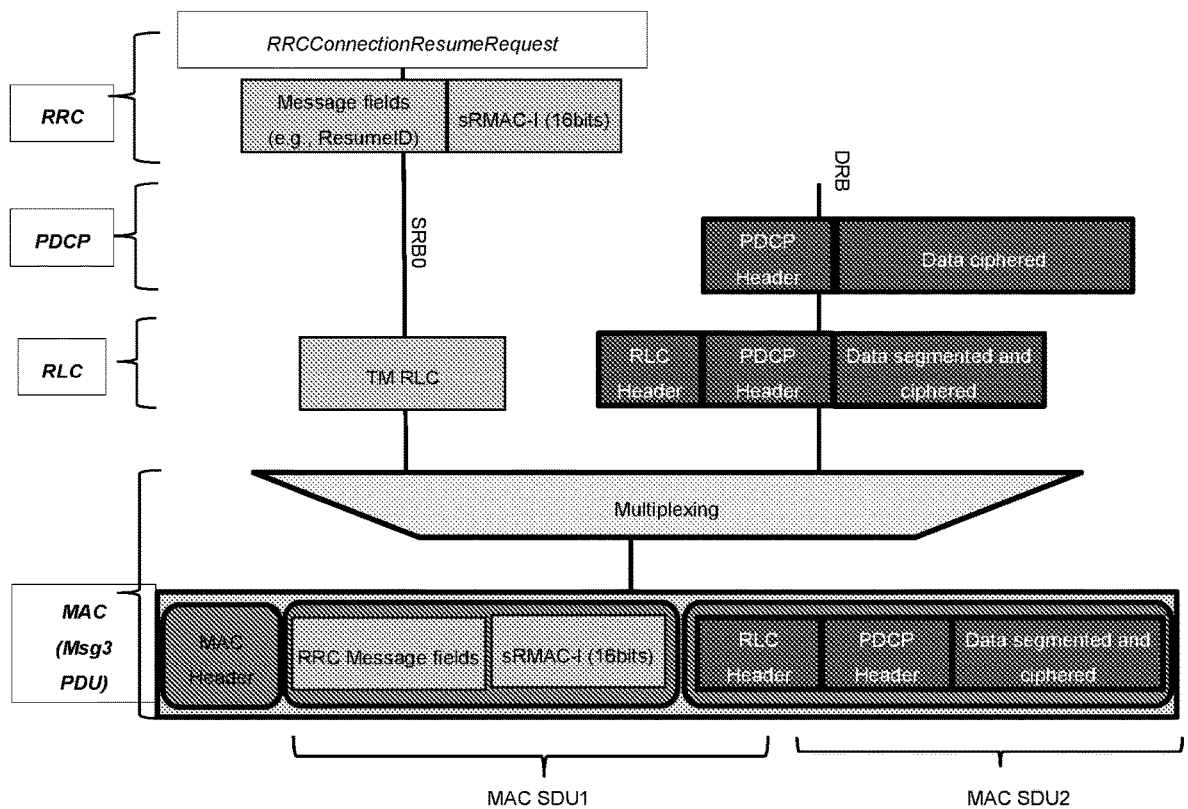
FIG. 3 illustrates an example layer 2 structure including security for a Msg3 transmission, according to certain embodiments.

Baseline Case: ResumeRequest Over SRB0 with Full 16-Bit shortResumeMAC-I at RRC Layer FIG. 3 illustrates a protocol structure and content of Msg3 for this baseline case. In certain embodiments, Msg3 with early UL data is protected similar to the current RRC Suspend/Resume solution, i.e., with 16-bit RRC sRMAC-I. As mentioned earlier, the RRC calculates the sRMAC-I and appends it to the ResumeRequest for validating the authenticity of the resume request, i.e., allowing the eNB to know that the request is coming from a legitimate UE. The ResumeRequest is transmitted on CCCH logical channel (SRB0) without AS security support. Whereas, the UL data is transmitted over DRB (see also FIG. 3) and thus is ciphered in PDCP sublayer. In some cases, such 16-bit sRMAC-I security token based protection of Msg3 can be considered sufficiently strong for forwarding UL data received in Msg3 from the eNB to the S-GW.

In some embodiments, Msg3 with UL early data is protected using the 16-bit shortResumeMAC-I security token calculated at the RRC layer and appended to the ResumeRequest.

When comparing this 16-bit sRMAC-I with 32-bit PDCP MAC-I AS integrity protection, there are two aspects to consider: the length of security parameter and the properties of security information. First, the length of 32 bits in the PDCP MAC-I may imply that MAC-I based protection is stronger than 16-bit RRC sRMAC-I security token based protection. Second, despite being generated using the same algorithm, keys, and parameters (see e.g., TS 33.401, 7.2), the sRMAC-I and PDCP MAC-I are calculated using different input messages. More specifically, the PDCP MAC-I is calculated based on the signaling message it is appended to, whereas the sRMAC-I is calculated based on a variable called VarShortResumeMAC-Input that consists of cell identity of the target eNB, physical cell ID of the source eNB, and the C-RNTI when the UE is with the source eNB (see e.g., TS 36.331) as below.

| VarShortResumeMAC-Input UE variable |
| --- |

```
-- ASN1START
VarShortResumeMAC-Input-r13 ::=  SEQUENCE {
    cellIdentity-r13              CellIdentity,
    physCellId-r13                PhysCellId,
    c-RNTI-r13                    C-RNTI,
    resumeDiscriminator-r13       BIT STRING(SIZE(1))
}
-- ASN1STOP
```

Thus, a security token like sRMAC-I has advantages in that it associates the location of UE with the security information, i.e., different security information is generated for different target nodes, which helps increase network security. However, the sRMAC-I parameter is not linked to the ResumeRequest itself, and thus does not provide any integrity protection of the actual content of the resume request message, which includes ResumeID and a resume cause value. Given that more information will be sent in early data Msg3, it is desirable to associate the security information, e.g., sRMAC-I with the content of message itself.

In certain embodiments, to further enhance security level for early data Msg3, more parameters in Msg3, such as ResumeID and/or cause value, are used as the input for computing security information.

In certain embodiments, to further enhance security level for early data Msg3, the data in DRB that is multiplexed with the RRC message is used as the input for computing security information. This embodiment can also be applied to other cases and embodiments described in this application.

In the following, three sets of embodiments to strengthen security for Msg3 in the baseline case are presented. The early data capable UE may decide to use either the baseline or any of those three sets of alternatives based on provided UL grant size.

In some embodiments, at the transmitter side, the UE selects based on the provided UL grant size for Msg3 to use either the baseline case or any of the three alternatives (cases 1, 2, and 3), presented in the following.

At the receiver side, since the eNB may not know the UE identity or capability at the reception of Msg3, eNB may have to blindly decode Msg3 with the two hypothesis that either there is no early data or there is early data together with a specific security parameter, e.g., according to one of the cases detailed below. Solutions for indicating whether there is early data in Msg3 or not, i.e., to distinguish with the legacy Msg3 have been proposed. Accordingly, certain embodiments contemplate the need to include a method for indicating which of the security measures (e.g., cases 1, 2, and 3) the UE is adopting. In some embodiments, the baseline case (1A) need not be indicated.

In some embodiments, to facilitate the decoding of Msg3, the UE indicates to the eNB which of the three alternatives (cases 1, 2, and 3). For example, the wireless device may indicate what security measures are being used by indicating the choice in unused bits in the Msg3 MAC PDU.

In some embodiments, for backward compatibility, only early data capable (Rel-15) UEs use the selected security solution when having sufficient UL grant size. Behavior of pre-Rel-15 UEs may remain unchanged.

Case 1: ResumeRequest Over SRB0 with Full 32-Bit ResumeMAC-I at RRC Layer

Figure 4:
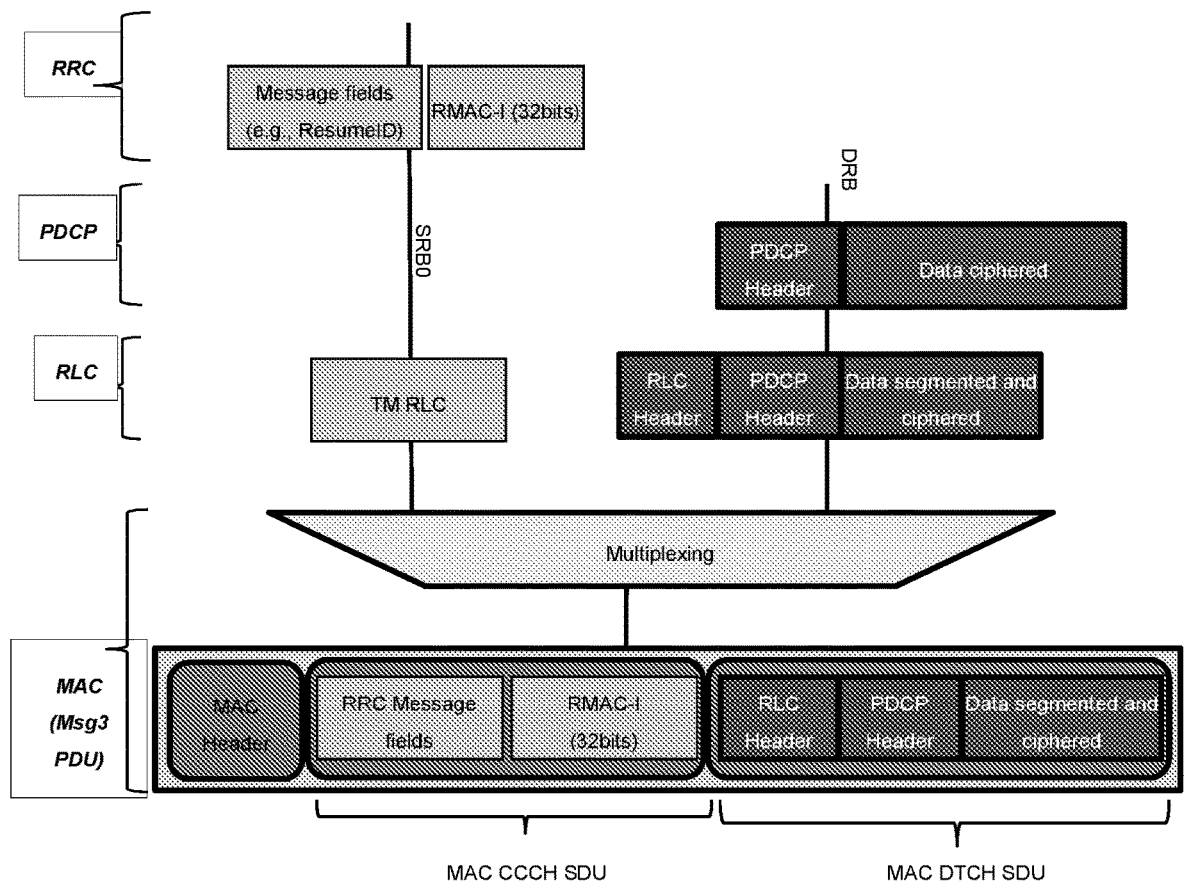
FIG. 4 illustrates a second example layer 2 structure including security for a Msg3 transmission, according to certain embodiments.

In the baseline case, with the 16-bit security token, attackers have higher chance of guessing the security information, compared to the legacy 32-bit MAC-I based protection. The sRMAC-I is assigned to the 16 least significant bits out of 32 bits ResumeMAC-I (RMAC-I) calculated using the VarShortResumeMAC-Input parameter. Thus, a way to enhance the security of Msg3 in the baseline case is to append this full 32-bit RMAC-I security token to the ResumeRequest, as illustrated in FIG. 4.

In one embodiment, the Msg3 with UL early data is protected using the 32-bit ResumeMAC-I calculated in the same way as the shortResumeMAC-I.

In this case 1, Msg3 and UL data has 32-bit security token based protection, thus allowing for higher security level when forwarding of UL data from the eNB to S-GW compared to the baseline case. This alternative requires only minor changes in protocol. In addition, this alternative retains the advantages of a security token based protection.

However, to support this functionality, the eNB must guarantee that the UL grant for Msg3 is sufficient for the early data capable UEs adopting this alternative, i.e., having at least 16 additional bits compared to the legacy UP solution.

In certain embodiments, to ensure that early data capable UEs can use this 32-bit ResumeMAC-I based protection for Msg3, the network node ensures there is an additional 16 bits in the UL grant for Msg3 to accommodate the 32-bit token, e.g., by adding at least 16 bits to the UL grant for Msg3 in the Random Access Response (RAR) message, i.e., Msg2.

In certain embodiments, the UE may produce/construct two or more RRC messages/PDUs, for the different possible/expected grant sizes, before initiating the RA procedure and selects one of the RRC messages/PDUs for inclusion in Msg3 based on the transport block (TB) size for Msg3 indicated in the received UL grant for Msg3. In some embodiments, the RRC messages/PDUs comprises sRMAC-Is or RMAC-I of different lengths. In some embodiments, the UE selects the largest of the RRC messages/PDUs that can be accommodated in the TB. The RRC messages/PDUs not included in the TB may be discarded. In this manner, the UE can have Msg3 prepared with varying security solutions prior to receiving the TB size and select the Msg3 with the best (e.g., most secure or with the largest security token) security solution based on the grant size.

In some embodiments, the UE initiates the RA procedure before producing/constructing or before completing production/construction of the RRC PDU, determines based on the TB size for Msg3 indicated in the received UL grant for Msg3 the content of the RRC message/PDU, and produces/constructs or completes production/construction of the RRC message/PDU. In some embodiments, the UE produces/constructs the largest RRC message/PDU that can be accommodated in the TB. In some embodiments, the largest RRC message/PDU that can be accommodated in the TB corresponds to using the longest sRMAC-I/RMAC-I that can be accommodated in the TB. In this manner, the UE may wait until it knows the TB size prior to determining what security solution to apply to Msg3, e.g., whether it can accommodate a 32-bit token or other larger security information beyond the 16-bit token.

In some embodiments, the UE produces/constructs an RRC message/PDU with one length of sRMAC-I/RMAC-I (e.g., 16 bits or 32 bits). Upon reception of the UL grant for Msg3 transmission, the UE then determines whether the produced/constructed RRC message/PDU can be accommodated in the TB size indicated in the received grant. If the TB size for Msg3 is insufficient to accommodate it, the UE discards the RRC message/PDU and constructs the largest RRC message/PDU that can be accommodated in the TB. In some embodiments, if the TB size for Msg3 is sufficient to accommodate it, the UE may proceed with transmission of the produced/constructed RRC message/PDU. In some embodiments, if the TB size for Msg3 is larger than needed to accommodate the produced/constructed RRC message/PDU, the UE determines if a larger RRC message/PDU (e.g., with a longer sRMAC-I/RMAC-I) can be accommodated in Msg3. If a larger RRC message/PDU can be accommodated, the UE may discard the RRC message/PDU and constructs the largest RRC message/PDU that can be accommodated in the TB. In some embodiments, the largest RRC message/PDU that can be accommodated in the TB corresponds to using the longest sRMAC-I/RMAC-I that can be accommodated in the TB. In this manner, the UE may adjust the security solution to provide the best security for Msg3 within the constraints of the granted uplink.

In some embodiments, The RRC message may be, e.g., an RRCConnectionResumeRequest message.

Solutions for the Case ResumeRequest is Transmitted Over SRB1

Given that in RRC Suspend/Resume, the resumed UE context and signaling bearers including SRB1 can be re-activated before Msg3 is submitted to lower layers, it is beneficial to transmit the ResumeRequest over SRB1 in early data transmissions since this option provides AS support, i.e., including integrity protection provided in PDCP sublayer.

Case 2: ResumeRequest Over SRB1 with 32-Bit PDCP MAC-I Protection

Figure 5:
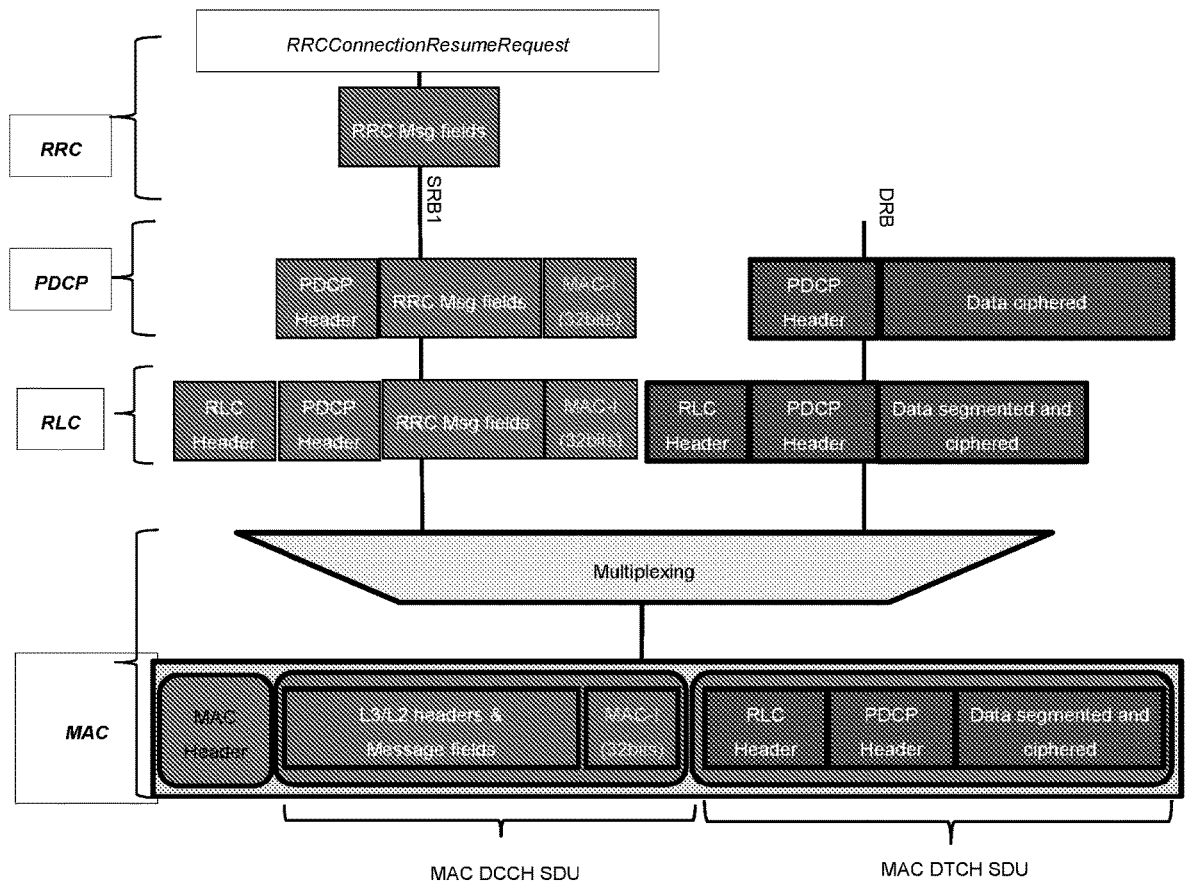
FIG. 5 illustrates a third example layer 2 structure including security for a Msg3 transmission, according to certain embodiments.

In certain embodiments, the ResumeRequest is transmitted over SRB1 so that Msg3 with UL early data can be protected with AS integrity protection functionality in PDCP sublayer. FIG. 5 illustrates an example layer 2 structure for Msg3 transmission over SRB1.

Similar to Case 1, to support this functionality, first, the eNB must guarantee that the UL grant for Msg3 is sufficient for the early data capable UEs adopting this alternative by adding at least 16 bits to the UL grant for Msg3 (in addition to the resources for UL data and signaling). For backward compatibility, only early data capable UEs transmit the ResumeRequest over SRB1.

In certain embodiments, sRMAC-I is not included ResumeRequest and the UE behavior at the RRC layer when forming the ResumeRequest is modified. In some embodiments, when using AS integrity protection for early data Msg3, the UE does not calculate and add the shortResume-MAC-I to the ResumeRequest in the RRC layer.

As discussed earlier, the (s)RMAC-I presents some advantages over the legacy PDCP MAC-I in terms of UE location and UE context awareness. Thus, the PDCP can consider calculating the MAC-I using similar parameters as in the sRMAC-I calculation. This requires modifications at PDCP sublayer. To be backward-compatible, this new way of calculating MAC-I at PDCP sublayer may be only applicable early data capable UEs when forming Msg3.

In some embodiments, when using AS integrity protection for early data Msg3, the PDCP sublayer can calculate the MAC-I value in another way taking into account the UE context and UE location. One example is to base the security information on the set of variables in a similar way as in sRMAC-I calculation in Rel-13 UP solution.

Case 3: ResumeRequest Over SRB1 with Hybrid Protection, Both Security Token and an Adaptive PDCP MAC-I (e.g., 16-Bit sRMAC-I at RRC Layer and X Bits MAC-I at PDCP)

Figure 6:
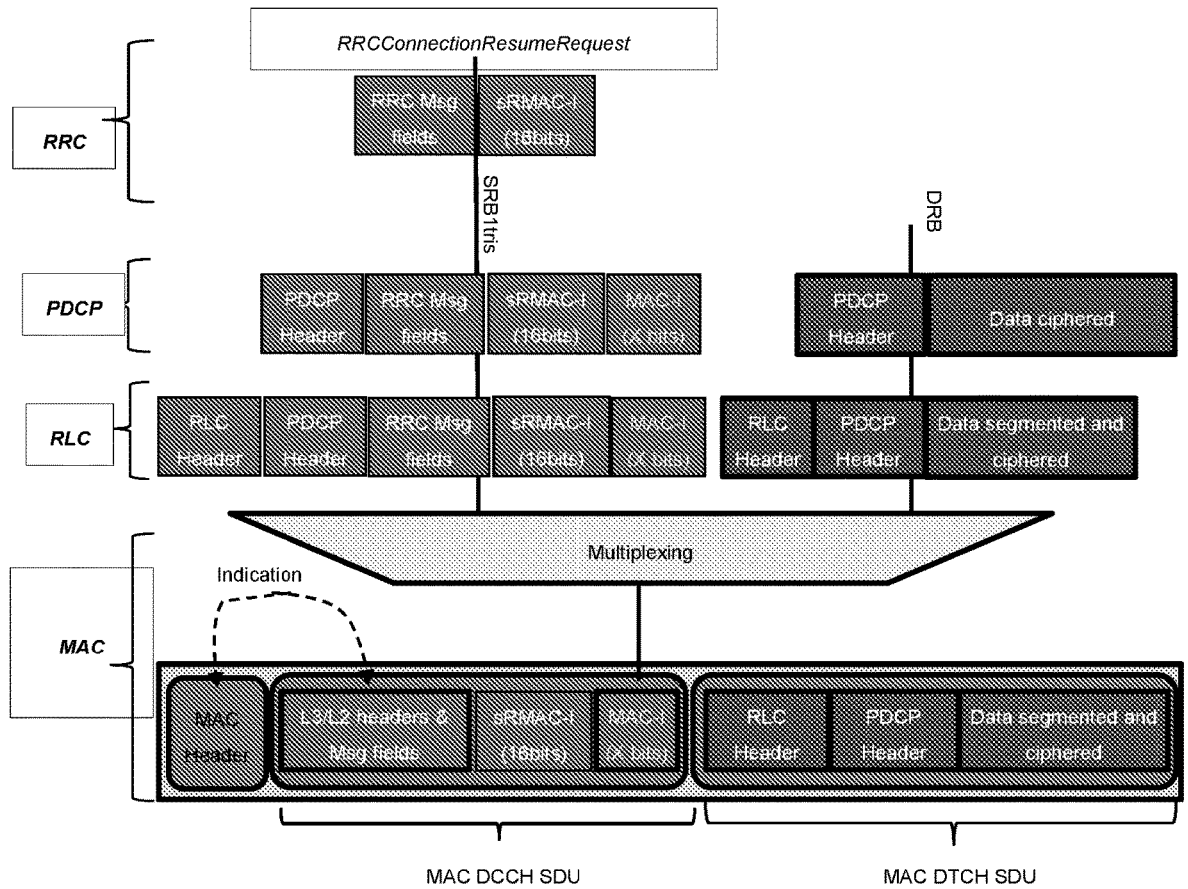
FIG. 6 illustrates another example layer 2 structure including security for a Msg3 transmission, according to certain embodiments.

In certain embodiments, both sRMAC-I calculated in the RRC layer and MAC-I calculated in the PDCP sublayer have their own security attributes. In some embodiments, the network node (e.g., eNB) does not always have to add, e.g., at least 16 bits to the grant for Msg3. Depending on the situation, the provided resources can be used for user data transmission or in some case the additional security information is not needed. In this case 3, a hybrid solution that flexibly combines the RRC sRMAC-I security token and the PDCP MAC-I is presented. An example of this hybrid solution is illustrated in FIG. 6.

In certain embodiments, the ResumeRequest is transmitted over SRB1 with hybrid protection using shortResume-MAC-I calculated in the RRC layer and a variable X bits of MAC-I calculated in PDCP sublayer. In some embodiments, X bits of MAC-I is derived by truncation of the full MAC-I. In some embodiment, X bits of MAC-I used in the hybrid solution (Case 3) is characterized in one or more of the following configurations:

X should be octet aligned, i.e., having the value of 0, 8, 16, 24, or 32 bits. X should be determined by PDCP sublayer at UE based on the TBS for Msg3 indicated by the MAC sublayer and on amount of UL data to be included in Msg3. (in some embodiments the UE may randomly selects an "X" value, determined by the PDCP sublayer and generate the message first and checks if it is possible to transmit using the grant provided by the eNB considering the UL data to be included. If it is not, it reselects another value and regenerates the message). In one example, when the provided UL grant is so small that minimal or zero amount of resources can be used for the MAC-I and UL data, X should be set to zero. In this case, most commonly the UE does not have early data in Msg3, thus falling back to the legacy UP solution with 16-bit sRMAC-I only. According to another example, if the grant size is so large that even the full 32-bit MAC-I is relatively small to remaining size that can be used for UL data, the UE can set X to 32 bits. In this case, the Msg3 and UL data has the strongest protection. In certain embodiments, X is indicated to enable the decoding of the security information at the eNB. Given that they can be up to 32 bits, the following methods of communicating the X value are contemplated, alternatively or in certain combinations thereof:

The value of X may be predefined via a System Information Block, e.g. SIB2. An existing unused 2 bits in the MAC PDU for Msg3, e.g., in MAC header and/or the header of ResumeRequest itself (see also FIG. 6), may be used to indicate the value of X (see also FIG. 6). Another possibility is to use a reserved bit in the PDCP header to indicate the value of X. Another possibility is to define and map the radio bearer on different logical channels for different values of X. Another possibility is to define and map the RRC message on different SRBs for different values of X. Another possibility is to determine the value of X based on the TB/MAC PDU, MAC SDU/RLC PDU, and/or RLC SDU/PDCP PDU sizes and/or presence of padding, and/or based on the mapping of expected DU sizes to a corresponding value of X, for example, in some padding in the MAC PDU may be indicative of the largest valid value of X if X=X1 and X=X2 correspond to DU sizes S1 and S2, respectively, the reception of a DU with size S1 is indicative of X=X1 and a DU with size S2 is indicative of X=X2, respectively.

In some embodiments, definition of a separate logical channel/SRB on which the SRB/RRC message is mapped may be used to resolve ambiguity due to differences in behavior between devices not supporting this feature (e.g., legacy devices) and devices supporting this feature and/or to resolve ambiguity between different RRC messages.

In current LTE, transmissions of signaling messages over SRB1 are not processed this way. Thus, modifications at L2 are needed to support this hybrid solution.

In certain embodiments, to support this hybrid solution, the following modifications at L2 may be made:

To simplify the operation, a new signaling radio bearer dedicated for the ResumeRequest that is intended for early data transmissions can be defined (i.e., SRB1tris in FIG. 6). This SRB1tris may have the same configuration and establishment procedure as the SRB1, but only reserved for early data ResumeRequest. The associated PDCP entity calculates MAC-I as usual but only appends X (e.g., least significant) bits instead of whole MAC-I to the respective PDCP PDU. Interactions between the PDCP and MAC sublayers are needed allow the PDCP to determine the value of X.

From the considered alternatives 2 and 3 above, other similar alternatives can be developed. Furthermore, it is possible to generalize the method in this section as in the embodiment below.

In another embodiment, the ResumeRequest is transmitted over SRB1 with Y bits RMAC-I calculated and added in the RRC layer and X bits MAC-I calculated and added in the PDCP sublayer. X and Y are octet aligned can be determined based not only on the provided UL grant size and available amount of UL data to be included in Msg3 but also the required or expected level of Msg3 protection. In addition, interactions among RRC layer, PDCP sublayer, and MAC sublayer are required to support the determination of X and Y when forming early data Msg3.

Figure 7:
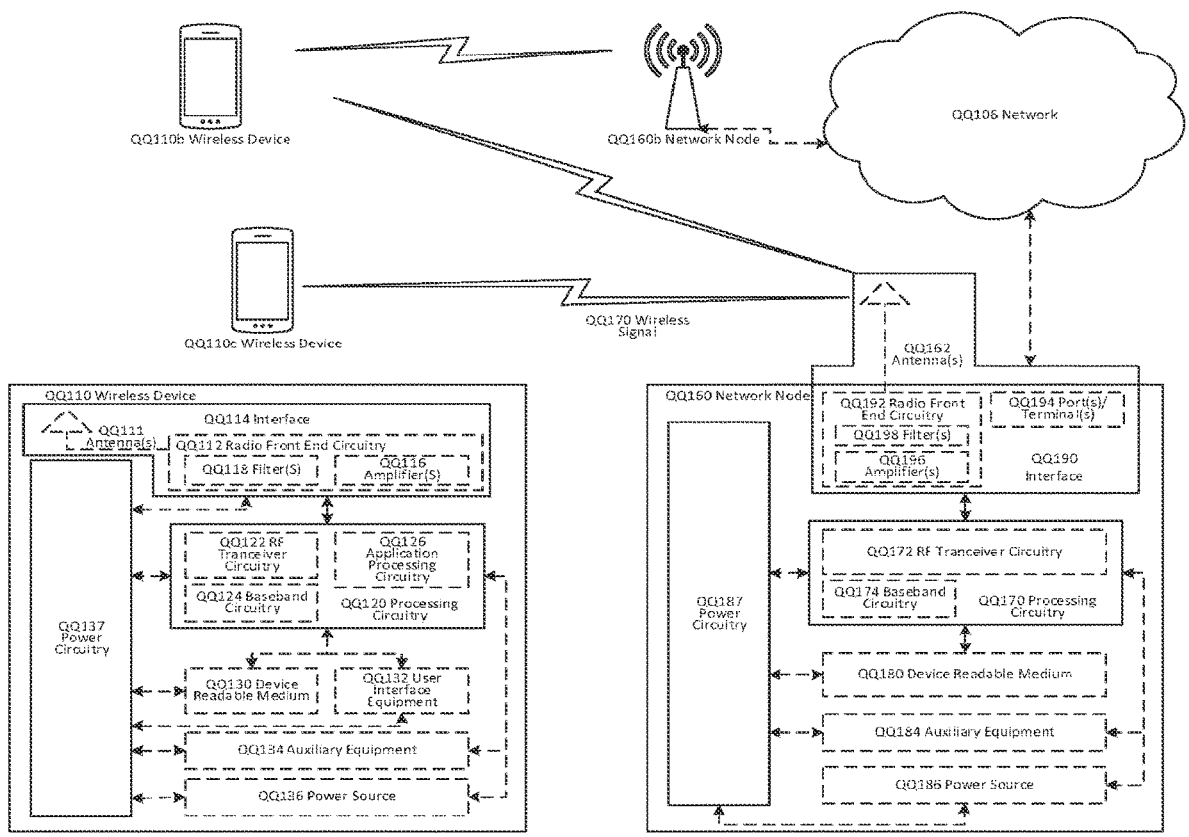
FIG. 7 illustrates an example wireless network, in accordance with certain embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 7 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 8:
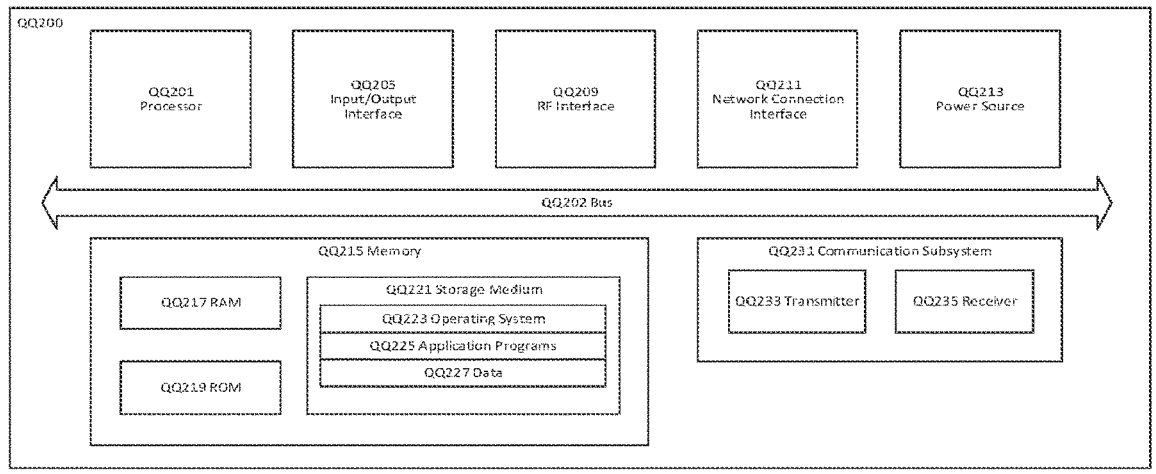
FIG. 8 illustrates an example user equipment, in accordance with certain embodiments.

FIG. 8: User Equipment in accordance with some embodiments

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although Figure QQ2 is a UE, the components discussed herein are equally applicable to a WD, and vice-versa.

In FIG. 8, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 8, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 9:
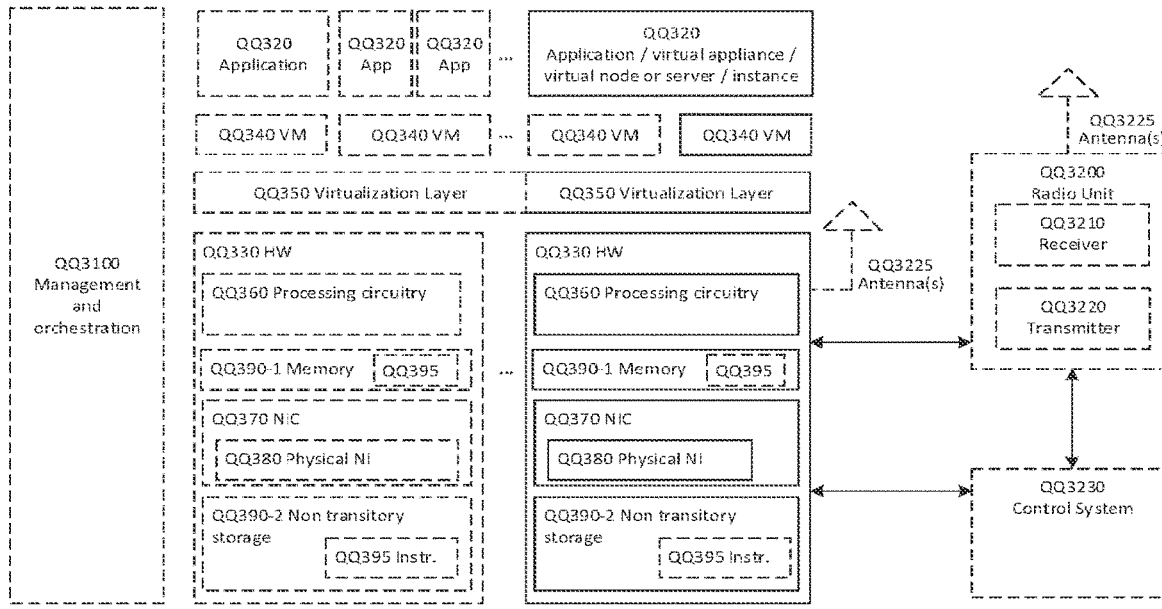
FIG. 9 illustrates an example virtualization environment, in accordance with certain embodiments.

FIG. 9: Virtualization environment in accordance with some embodiments

FIG. 9 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 9, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 9.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 10:
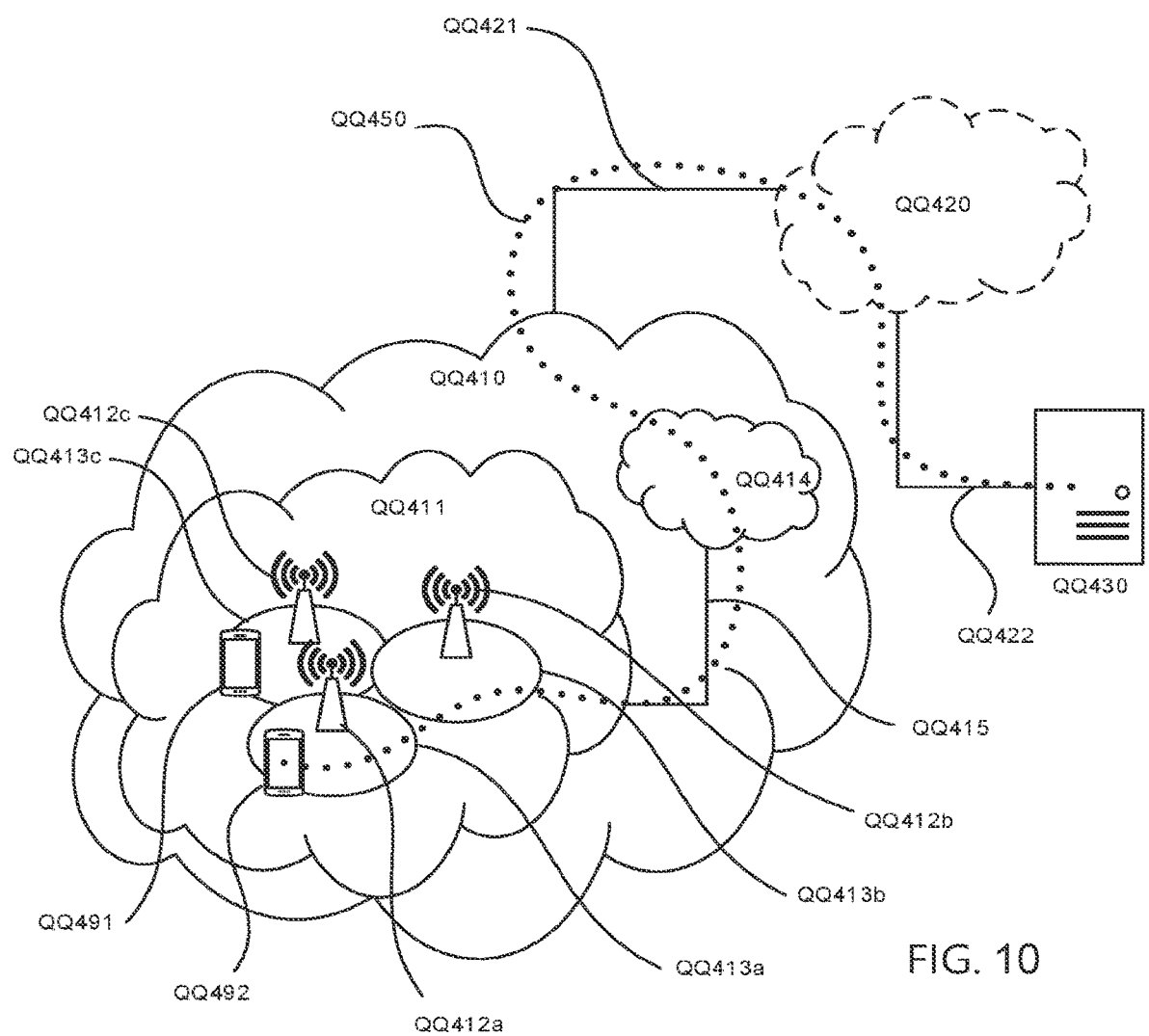
FIG. 10 illustrates an example telecommunication network connected via an intermediate network to a host computer, in accordance with certain embodiments.

FIG. 10: Telecommunication network connected via an intermediate network to a host computer in accordance with some embodiments With reference to FIG. 10, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 10 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 11:
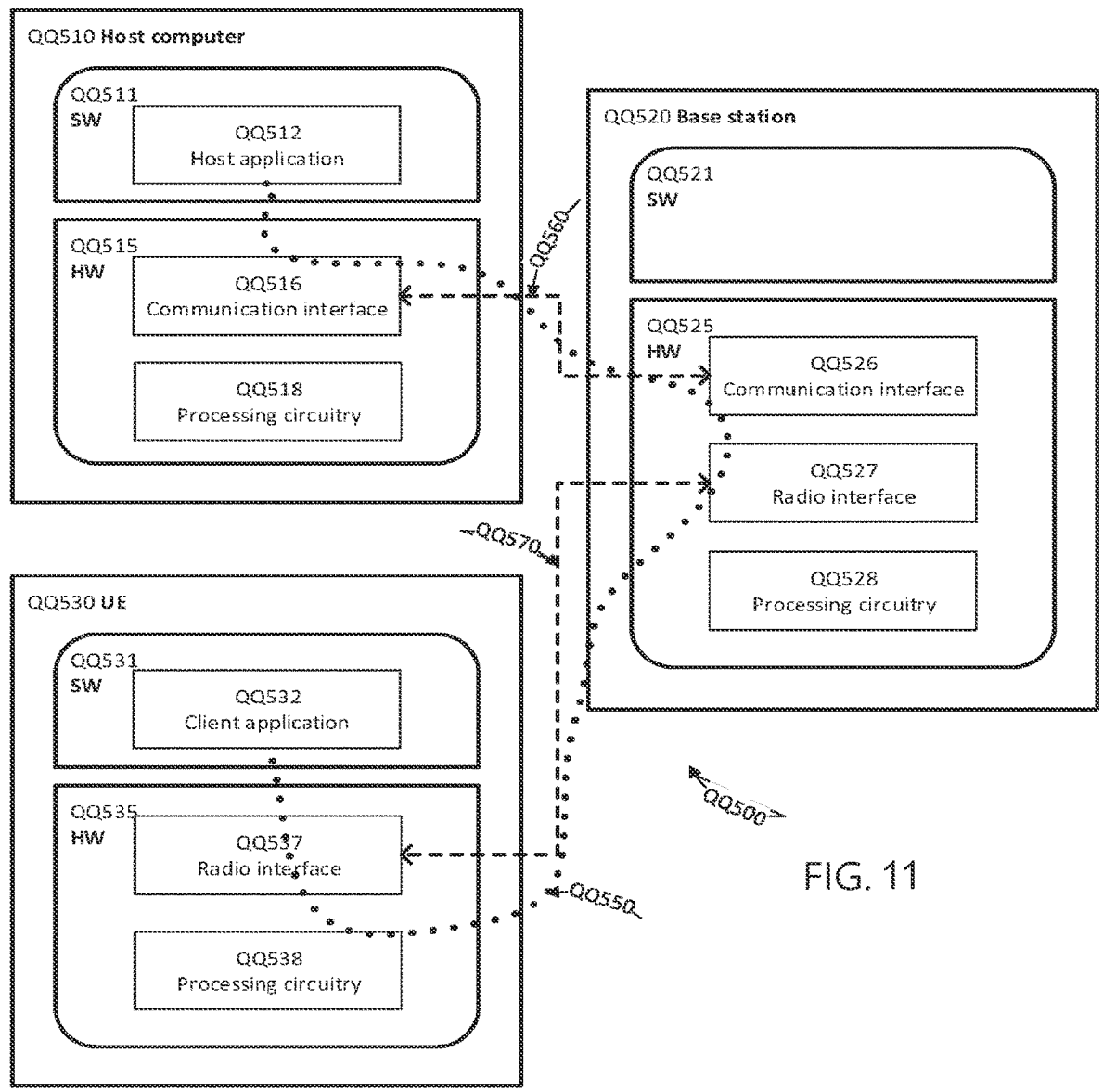
FIG. 11 illustrates an example host computer communicating via a base station with a user equipment over a partially wireless connection, in accordance with certain embodiments.

FIG. 11: Host computer communicating via a base station with a user equipment over a partially wireless connection in accordance with some embodiments Example implementations, in accordance with an embodiment, of the UE, base station and host computer discussed in the preceding paragraphs will now be described with reference to FIG. 11. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in Figure QQ5) served by base station QQ520. Communication interface QQ526 may be configured to facilitate connection QQ560 to host computer QQ510. Connection QQ560 may be direct or it may pass through a core network (not shown in FIG. 11) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 11 may be similar or identical to host computer QQ430, one of base stations QQ412a, QQ412b, QQ412c and one of UEs QQ491, QQ492 of FIG. 10, respectively. This is to say, the inner workings of these entities may be as shown in FIG. 11 and independently, the surrounding network topology may be that of FIG. 10.

In FIG. 11, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the security of early data and thereby provide benefits such as making it difficult for someone to tamper with another user.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 12:
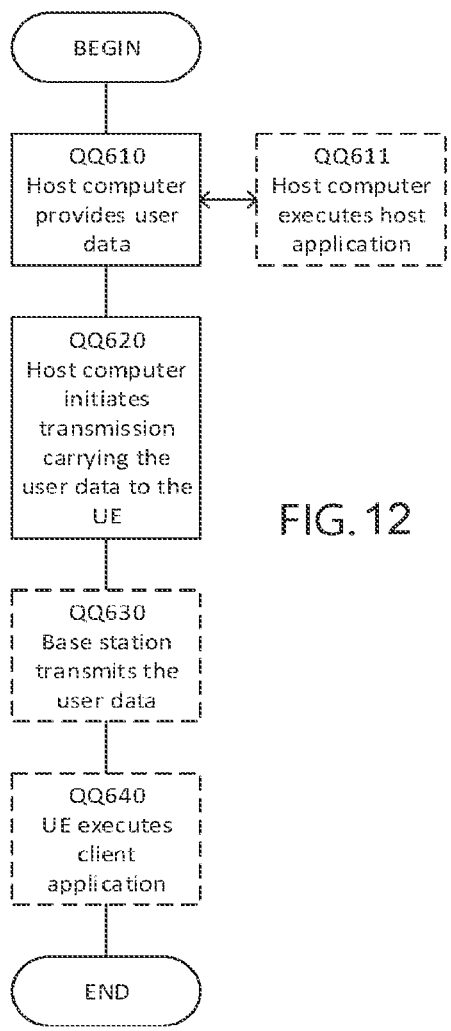
FIG. 12 is a flowchart illustrating an example method implemented in a communication system, in accordance certain embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 13:
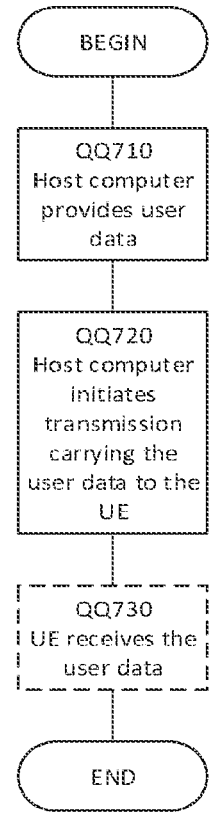
FIG. 13 is a flowchart illustrating a second example method implemented in a communication system, in accordance with certain embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 14:
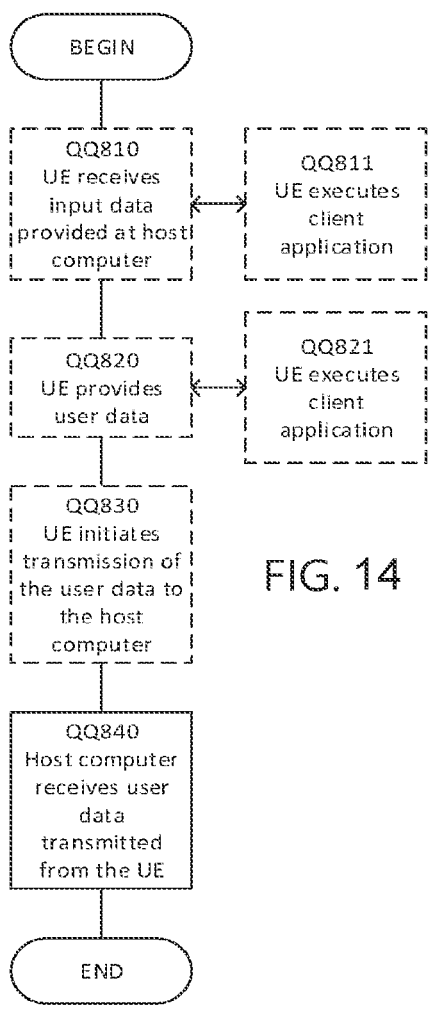
FIG. 14 is a flowchart illustrating a third method implemented in a communication system, in accordance with certain embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 15:
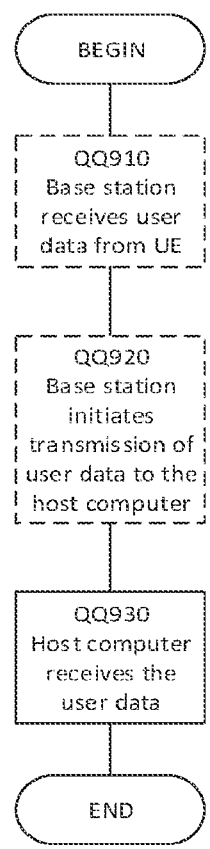
FIG. 15 is a flowchart illustrating a fourth method implemented in a communication system, in accordance with certain embodiments.
Figure 16:
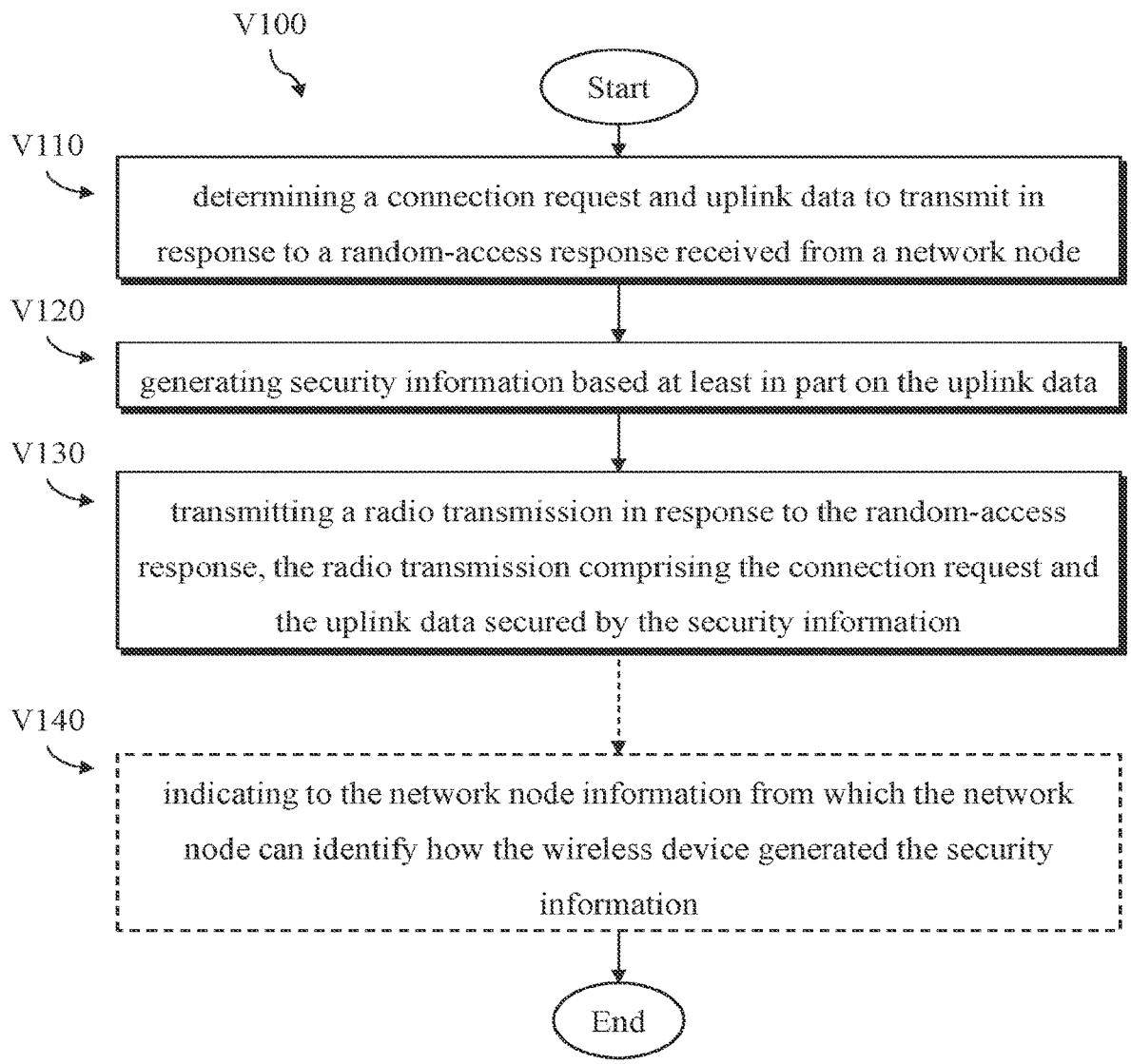
FIG. 16 illustrates an example method performed by a network node, in accordance with certain embodiments.
Figure 17:
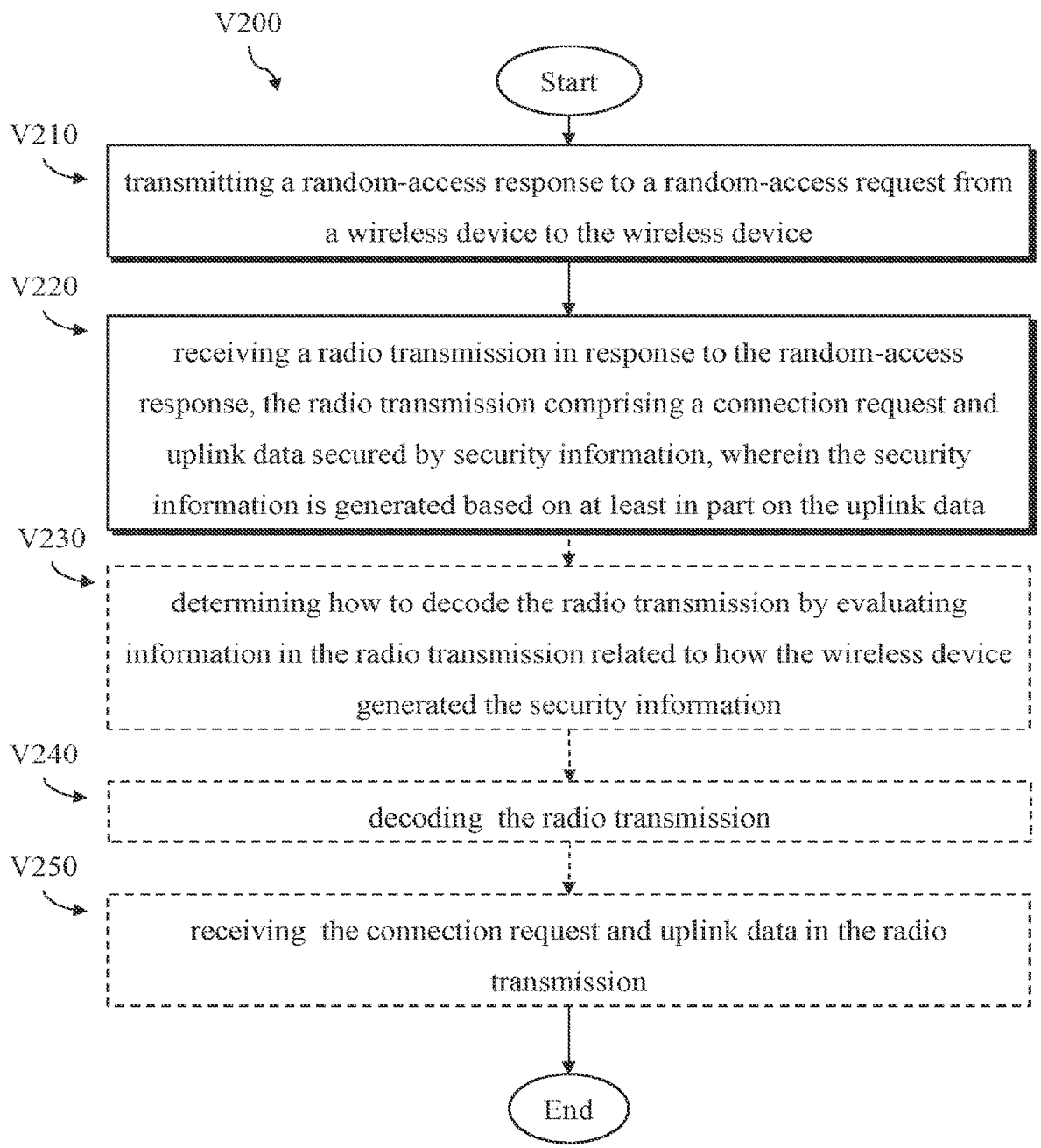
FIG. 17 illustrates an example method performed by a wireless device, such as a user equipment, in accordance with certain embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

EMBODIMENTS

Group A Embodiments

1. A method performed by a wireless device for enhancing the security for early data MSG3, the method comprising one or more of the steps described above.

2. The method of any of the previous embodiments, further comprising:
   providing user data; and
   forwarding the user data to a host computer via the transmission to the base station.

Group B Embodiments

3. A method performed by a base station for enhancing the security for early data MSG3, the method comprising one or more of the steps described above.

4. The method of any of the previous embodiments, further comprising:
   obtaining user data; and
   forwarding the user data to a host computer or a wireless device.

Group C Embodiments

5. A wireless device for enhancing the security for early data MSG3, the wireless device comprising:
   processing circuitry configured to perform any of the steps of any of the Group A embodiments; and
   power supply circuitry configured to supply power to the wireless device.

6. A base station for enhancing the security for early data MSG3, the base station comprising:
   processing circuitry configured to perform any of the steps of any of the Group B embodiments;
   power supply circuitry configured to supply power to the wireless device.

7. A user equipment (UE) for enhancing the security for early data MSG3, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.

8. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.

9. The communication system of the pervious embodiment further including the base station.

10. The communication system of the previous 2 embodiments, further including the UE, wherein the UE is configured to communicate with the base station.

11. The communication system of the previous 3 embodiments, wherein:
    the processing circuitry of the host computer is configured to execute a host application, thereby providing the user data; and
    the UE comprises processing circuitry configured to execute a client application associated with the host application.

12. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs any of the steps of any of the Group B embodiments.

13. The method of the previous embodiment, further comprising, at the base station, transmitting the user data.

14. The method of the previous 2 embodiments, wherein the user data is provided at the host computer by executing a host application, the method further comprising, at the UE, executing a client application associated with the host application.

15. A user equipment (UE) configured to communicate with a base station, the UE comprising a radio interface and processing circuitry configured to performs the of the previous 3 embodiments.

16. A communication system including a host computer comprising:
    processing circuitry configured to provide user data; and
    a communication interface configured to forward user data to a cellular network for transmission to a user equipment (UE),
    wherein the UE comprises a radio interface and processing circuitry, the UE's components configured to perform any of the steps of any of the Group A embodiments.

17. The communication system of the previous embodiment, wherein the cellular network further includes a base station configured to communicate with the UE.

18. The communication system of the previous 2 embodiments, wherein:
    the processing circuitry of the host computer is configured to execute a host application, thereby providing the user data; and
    the UE's processing circuitry is configured to execute a client application associated with the host application.

19. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs any of the steps of any of the Group A embodiments.

20. The method of the previous embodiment, further comprising at the UE, receiving the user data from the base station.

21. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

22. The communication system of the previous embodiment, further including the UE.

23. The communication system of the previous 2 embodiments, further including the base station, wherein the base station comprises a radio interface configured to communicate with the UE and a communication interface configured to forward to the host computer the user data carried by a transmission from the UE to the base station.

24. The communication system of the previous 3 embodiments, wherein:
the processing circuitry of the host computer is configured to execute a host application; and
the UE's processing circuitry is configured to execute a client application associated with the host application, thereby providing the user data.

25. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

26. A method implemented in a communication system including a host computer, a base station and a user equipment (UE), the method comprising:
at the host computer, receiving user data transmitted to the base station from the UE, wherein the UE performs any of the steps of any of the Group A embodiments.

27. The method of the previous embodiment, further comprising, at the UE, providing the user data to the base station.

28. The method of the previous 2 embodiments, further comprising:
at the UE, executing a client application, thereby providing the user data to be transmitted; and
at the host computer, executing a host application associated with the client application.

29. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

30. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

31. The communication system of the previous embodiment further including the base station.

32. The communication system of the previous 2 embodiments, further including the UE, wherein the UE is configured to communicate with the base station.

33. The communication system of the previous 3 embodiments, wherein:
the processing circuitry of the host computer is configured to execute a host application;
the UE is configured to execute a client application associated with the host application, thereby providing the user data to be received by the host computer.

34. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

35. The method of the previous embodiment, further comprising at the base station, receiving the user data from the UE.

36. The method of the previous 2 embodiments, further comprising at the base station, initiating a transmission of the received user data to the host computer.

FIGURE V1 illustrates an example method V100 for use in a wireless device, according to certain embodiments. Method V100 may begin at step V110 with determining a connection request and uplink data to transmit in response to a random-access response received from a network node. For example, a wireless device, such as UE, may determine an RRCConnectionResumeRequest and uplink data to transmit in Msg3 of a random-access procedure in response to receive a Msg2 transmission from a target network node (e.g., an eNB).

At step V120, security information may be generated based at least in part on the uplink data. For example, a wireless device may generate a security token at the RRC layer, which is used to secure the connection request. In some embodiments, the security information comprises a 16-bit or 32-bit security token. For example, the wireless device may generate a 16-bit or 32-bit (s)RMAC-I, which may be applied to the ResumeRequest passed to the PDCP and RLC layers via Signal Radio Bearer 0.

In certain embodiments, the security information is generated at least in part at the PDCP layer. For example, the ResumeRequest may be transmitted over Signal Radio Bearer 1 and MAC-I bits are calculated at the PDCP sublayer. In this manner, access stratum integrity protection may be provided for early data Msg3. In some embodiments, part of the security information is generated at the RRC sublayer and part of the security information is generated at the PDCP sublayer. For example, a 16-bit sRMAC-I token may be generated at the RRC sublayer and an X-bit MAC-I may be generated at the PDCP sublayer, and the combination thereof is used to secure early data Msg3.

In certain embodiments, the security information is generated based in part on the uplink data. For example, in some embodiments, a security token may be generated using information associated with the ResumeRequest, such as the ResumeID and a resume cause value. As another example, a security token may be generated based on the content of the early data being sent in the radio transmission. In this manner, the wireless device may generate security information that is harder to decrypt, even if a would-be attacker had knowledge of the network topology and attributes of the network components.

At step V130, a radio transmission is transmitted in response to the random-access response. The radio transmission includes the connection request and the uplink data secured by the security information. In certain embodiments, the connection request and uplink data are multiplexed to form the radio transmission. For example, Msg3 may be constructed by multiplexing the connection request and uplink data with the generated security information. In some embodiments, the connection request is transmitted using the SRB0 radio bearer prior to multiplexing. In other embodiments, the connection request is transmitting using the SRB1 radio bearer prior to multiplexing. As a result, the early data Msg3 may be transmitted in response to Msg2 with the uplink data secured with a more robust security information.

In certain embodiments, the size of the security information is based on a received uplink grant from the network node. For example, the wireless device may adjust the size of the security token and/or MAC-I security information based on a transport block size allocated by the network node. In some embodiments, the wireless device may generate two or more preliminary radio transmissions, wherein the two or more preliminary radio transmissions comprise different message sizes. The different sizes may be based on selecting a 16-bit vs. a 32-bit security token and/or varying the number of bits of a MAC-I appended to an sRMAC-I. The wireless device may select one of the preliminary radio transmissions for transmission based on a transport block size indicated in the random-access response. For example, the wireless device may select a 16-bit security token or to include less bits of the MAC-I if the allocated transport block size cannot accommodate more security information (e.g., a 32-bit security token or a 16-bit MAC-I on top of a 16-bit security token). In some embodiments, the largest of the possible radio transmissions that can be accommodated by the indicated transport block size is selected to transmit as the radio transmission, thereby ensuring the best security for the transmission.

The size of the transmission may be done before or after receiving the indication of the transport block size from the network node. For example, the wireless device may generate a first preliminary radio transmission and then, determine that a transport block size indicated in the random-access response is insufficient to accommodate the first preliminary radio transmission. The wireless device may, in response, generate a second preliminary radio transmission having a largest size that can be accommodated by the indicated transport block size and transmit this as the response to the random-access response. As another example, the wireless device may determine that a transport block size indicated in the random-access response can accommodate a larger radio transmission than the first preliminary radio transmission. The wireless device may, in response generate a second preliminary radio transmission having a largest size that can be accommodated by the indicated transport block size. In some embodiments, the largest size that can be accommodated by the indicated transport block size corresponds to a longest length that can be used for the security information.

In certain embodiments, method V100 may include additional or fewer steps. In certain embodiments, method V100 includes the optional step V140, wherein information from which the network node can identify how the wireless device generated the security information is indicated to the network node. For example, the wireless device may indicate what type of security information is being used by indicating the choice in unused bits in the Msg3 MAC PDU. In some embodiments, the wireless device may indicate the number of bits used as part of the security information. For example, the number of bits of MAC-I may be indicated to the network node in a variety of ways, such as having the number be predefined via a SIB, indicating in the MAC PDU, indicating in the PDCP header, indicating based on a mapping of the radio bearer on different logical channels, indicating based on mapping the RRC message on different SRBs, or indicating based on the PDU sizes and/or presence of padding. In this manner, the network node may successfully decode the transmission using the enhanced security information.

FIGURE V2 illustrates an example method V200 for use in a network node, according to certain embodiments. Method V200 may begin at step V210 with transmitting a random-access response in response to a random-access request from a wireless device. For example, a network node may communicate a Msg2 response, wherein the Msg2 response indicates a transport block size allocated for the next random-access transmission from the wireless device.

At step V220, a radio transmission is received in response to the random-access response. The radio transmission includes a connection request and uplink data secured by security information. For example, the radio transmission may include security information generated in any of the variety of manners described in this disclosure. For example, the security information may be generated based on at least in part on the uplink data, as described above.

In certain embodiments, method V200 may include additional steps. For example, in certain embodiments, method V200 includes optional step V230, wherein determining how to decode the radio transmission is based on evaluating information in the radio transmission related to how the wireless device generated the security information. For example, the network node may receive an indication from the wireless device about the security information, e.g., the length of the security information and/or the type (e.g., sRMAC-I from the RRC sublayer, MAC-I from the PDCP sublayer, or some combination thereof). In this manner, the network node may have sufficient information to decode the early data Msg3 accurately.

In certain embodiments, method V200 may further include optional steps V240 and V250. At step V240, the network node may decode the radio transmission, e.g., based on the determination of how Msg3 was secured. At step V250, the connection request and uplink data are received at the network node. This information may be used to further the random access procedure with the wireless device. In this manner, the enhanced security information may be used without interfering with the network node's ability to decode the better secured connection request and uplink data.

Modifications, additions, or omissions may be made to any of methods V100 and V200 depicted in FIGURES V1 and V2. Any steps may be performed in parallel or in any suitable order. For example, in certain embodiments, one or more steps of methods V100 and V200 may be repeated for a different performance coating and/or separate fluorescent layer. Furthermore, methods V100 and V200 may include more, fewer, or other steps. Additionally, one or more of the steps of methods V100 and V200, or embodiments thereof, may be performed by any suitable component or combination of components of network nodes QQ160, QQ330, QQ412, QQ520 or wireless devices QQ110, QQ200, QQ330, QQ491, QQ492, QQ530, or any other component described herein.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A method for use in a wireless device, comprising:
   receiving an uplink grant;
   determining a connection request and uplink data to transmit in response to a random- access response received from a network node;
   generating 32 bits of security information based at least in part on the uplink data, wherein based at least in part on an amount of uplink data and the uplink grant, the 32 bits of security information is divided across a radio resource control (RRC) layer and a Packet Data Convergence Protocol (PDCP) layer, wherein the security information comprises a security token, and wherein generating the security information is further based on a ResumeID and a cause value, and wherein the security information is generated based on at least a part of the security information is generated at the RRC layer and at least a part of the security information is generated at the PDCP layer; and
   transmitting a radio transmission in response to the random-access response, the radio transmission comprising the connection request and the uplink data secured by the security information, wherein the security token is generated based on an early message being sent in the radio transmission.

2. The method of claim 1, wherein the security information comprises a message authentication code.

3. The method of claim 1, wherein a size of the security information is based on a received uplink grant from the network node.

4. The method of claim 1, further comprising:
   generating two or more preliminary radio transmissions, wherein the two or more preliminary radio transmissions comprise different message sizes; and
   selecting to transmit a respective one of the preliminary radio transmissions as the radio transmission based on a transport block size indicated in the random-access response.

5. The method of claim 4, wherein a largest of the two or more preliminary radio transmissions that can be accommodated by the indicated transport block size is selected to transmit as the radio transmission.

6. The method of claim 1, further comprising:
   generating a first preliminary radio transmission;
   determining that a transport block size indicated in the random-access response is insufficient to accommodate the first preliminary radio transmission; and
   generating a second preliminary radio transmission having a largest size that can be accommodated by the indicated transport block size, wherein the second preliminary radio transmission is transmitted as the radio transmission.

7. The method of claim 1, further comprising:
   generating a first preliminary radio transmission;
   determining that a transport block size indicated in the random-access response can accommodate a larger radio transmission than the first preliminary radio transmission;
   generating a second preliminary radio transmission having a largest size that can be accommodated by the indicated transport block size, wherein the second preliminary radio transmission is transmitted as the radio transmission.

8. The method of claim 6, wherein the largest size that can be accommodated by the indicated transport block size corresponds to a longest length that can be used for the security information.

9. The method of claim 1, wherein the radio transmission is secured according to one of the following:
   with access stratum integrity protection;
   without access stratum integrity protection.

10. The method of claim 1, further comprising multiplexing the connection request and uplink data to form the radio transmission.

11. The method of claim 10, wherein the connection request is transmitted using a signaling radio bearer 0 (SRB0) radio bearer prior to multiplexing.

12. The method of claim 10, wherein the connection request is transmitting using a signaling radio bearer 1 (SRB1) radio bearer prior to multiplexing.

13. The method of claim 1, further comprising indicating to the network node information from which the network node can identify how the wireless device generated the security information.

14. A wireless device comprising memory operable to store instructions and processing circuitry operable to execute the instructions, whereby the wireless device is operable to:
   receive an uplink grant;
   determine a connection request and uplink data to transmit in response to a random- access response received from a network node;
   generate 32 bits of security information based at least in part on the uplink data wherein based at least in part on an amount of uplink data to transmit and the uplink grant the 32 bits of security information is divided across a radio resource control (RRC) layer and a Packet Data Convergence Protocol (PDCP) layer security information based at least in part on the uplink data, wherein the security information comprises a security token, and, wherein generating the security information is further based on a ResumeID and a cause value, and wherein the security information is generated based on at least a part of the security information is generated at the RRC layer and at least a part of the security information is generated at the PDCP layer; and
   transmit a radio transmission in response to the random-access response, the radio transmission comprising the connection request and the uplink data secured by the security information, wherein the security token is generated based on an early message being sent in the radio transmission.

15. The wireless device of claim 14, wherein the security information comprises a message authentication code.

16. The wireless device of claim 14, wherein a size of the security information is based on a received uplink grant from the network node.

17. The wireless device of claim 14, wherein the wireless device is further operable to:

generate two or more preliminary radio transmissions, wherein the two or more preliminary radio transmissions comprise different message sizes; and select to transmit a respective one of the preliminary radio transmissions as the radio transmission based on a transport block size indicated in the random-access response.

18. The wireless device of claim 17, wherein a largest of the two or more preliminary radio transmissions that can be accommodated by the indicated transport block size is selected to transmit as the radio transmission.

19. The wireless device of claim 14, wherein the wireless device is further operable to:
generate a first preliminary radio transmission;
determine that a transport block size indicated in the random-access response is insufficient to accommodate the first preliminary radio transmission; and
generate a second preliminary radio transmission having a largest size that can be accommodated by the indicated transport block size, wherein the second preliminary radio transmission is transmitted as the radio transmission.

20. The wireless device of claim 14, wherein the wireless device is further operable to:
generate a first preliminary radio transmission;
determine that a transport block size indicated in the random-access response can accommodate a larger radio transmission than the first preliminary radio transmission; and
generate a second preliminary radio transmission having a largest size that can be accommodated by the indicated transport block size, wherein the second preliminary radio transmission is transmitted as the radio transmission.

21. The wireless device of claim 19, wherein the largest size that can be accommodated by the indicated transport block size corresponds to a longest length that can be used for the security information.

22. The wireless device of claim 14, wherein the radio transmission is secured according to one of the following:
with access stratum integrity protection; or
without access stratum integrity protection.

23. The wireless device of claim 14, wherein the wireless device is further operable to multiplexing the connection request and uplink data to form the radio transmission.

24. The wireless device of claim 23, wherein the connection request is transmitted using a signaling radio bearer 0 (SRB0) radio bearer prior to multiplexing.

25. The wireless device of claim 23, wherein the connection request is transmitting using a signaling radio bearer 1 (SRB1) radio bearer prior to multiplexing.

26. The wireless device of claim 14, wherein the wireless device is further operable to indicate to the network node information from which the network node can identify how the wireless device generated the security information.

27. A method for use in a network node, comprising:
transmitting an uplink grant;
transmitting a random-access response to a random-access request from a wireless device to the wireless device; and
receiving a radio transmission in response to the random-access response, the radio transmission comprising a connection request and uplink data secured by 32 bits of security information;
wherein the security information is generated based on at least in part on an amount of the uplink data and the uplink grant, wherein the 32 bits of security information is divided across a radio resource control (RRC) layer and a Packet Data Convergence Protocol (PDCP) layer, wherein the security information comprises a security token, wherein generating the security information is further based on a ResumeID and a cause value, and wherein the security token is generated based on an early message being sent in the radio transmission, and, wherein the security information is generated based on at least a part of the security information is generated at the RRC layer and at least a part of the security information is generated at the PDCP layer.

28. A network node comprising memory operable to store instructions and processing circuitry operable to execute the instructions, whereby the network node is operable to:
transmit an uplink grant;
transmit a random-access response to a random-access request from a wireless device to the wireless device; and
receive a radio transmission in response to the random-access response, the radio transmission comprising a connection request and uplink data secured by 32 bits of security information;
wherein the security information is generated based on at least in part on an amount of the uplink data and the uplink grant, wherein the 32 bits of security information is divided across a radio resource control (RRC) layer and a Packet Data Convergence Protocol (PDCP) layer, wherein the security information comprises a security token, wherein generating the security information is further based on a ResumeID and a cause value, and wherein the security token is generated based on an early message being sent in the radio transmission, and, wherein the security information is generated based on at least a part of the security information is generated at the RRC layer and at least a part of the security information is generated at the PDCP layer.

* * * * *